(12) United States Patent
Ko

(10) Patent No.: US 12,311,842 B2
(45) Date of Patent: May 27, 2025

(54) SYSTEM AND METHOD FOR CONTROLLING LIGHTING DEVICE FOR STEERING WHEEL

(71) Applicant: HYUNDAI MOBIS CO., LTD., Seoul (KR)

(72) Inventor: Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 162 days.

(21) Appl. No.: 18/458,231

(22) Filed: Aug. 30, 2023

(65) Prior Publication Data

US 2024/0140309 A1 May 2, 2024

(30) Foreign Application Priority Data

Oct. 26, 2022 (KR) .................. 10-2022-0139467

(51) Int. Cl.
*B60Q 3/80* (2017.01)
*B60Q 3/283* (2017.01)
*B60Q 3/70* (2017.01)
*B62D 15/02* (2006.01)

(52) U.S. Cl.
CPC ............. *B60Q 3/80* (2017.02); *B60Q 3/283* (2017.02); *B60Q 3/70* (2017.02); *B62D 15/0215* (2013.01)

(58) Field of Classification Search
CPC .... B62D 1/04–065; B62D 15/00–0295; B60K 35/21; B60K 35/28; B60K 35/60; B60K 2360/33–349; B60Q 3/283; B60Q 3/70; B60Q 3/80; B60Q 9/00; B60Y 2400/83
See application file for complete search history.

(56) References Cited

U.S. PATENT DOCUMENTS 11,554,716 B1 * 1/2023 Yasuda .................. B60K 35/10

FOREIGN PATENT DOCUMENTS

JP 5599807 B2 10/2014
WO 2010/051090 A1 5/2010

* cited by examiner

*Primary Examiner* — Jason M Han
(74) *Attorney, Agent, or Firm* — NovoTechIP International PLLC

(57) ABSTRACT

Disclosed are a system and method for controlling a lighting device for a steering wheel. The system includes the lighting device mounted on the steering wheel and configured to be selectively turned on in order to indicate left/right directions of a vehicle, and a controller configured, upon receiving a request for turning on of the lighting device, to control turn-on operation of the lighting device such that left/right lighting directions of the lighting device are identical to the left/right directions of the vehicle when the angular position of the steering wheel is within a first steering angle range encompassing a steering angle neutral position and such that the left/right lighting directions of the lighting device are opposite the left/right directions of the vehicle when the angular position of the steering wheel is within an inverted steering angle range vertically inverted from the normal steering angle range.

16 Claims, 10 Drawing Sheets

SYSTEM AND METHOD FOR CONTROLLING LIGHTING DEVICE FOR STEERING WHEEL

CROSS-REFERENCE TO RELATED APPLICATIONS

This application claims the priority benefit of Korean Patent Application No. 10-2022-0139467, filed on Oct. 26, 2022 in the Korean Intellectual Property Office, the disclosure of which is incorporated herein by reference.

TECHNICAL FIELD

The present disclosure relates to a system and method for controlling a lighting device for a steering wheel, which provides accurate direction information regardless of an angular position of the steering wheel.

BACKGROUND

Visual and acoustic notification systems are employed for communication between a vehicle and a driver. In particular, technology for mounting a lighting system to a steering wheel provided in front of a driver's seat has recently been developed in order to provide various pieces of information to a driver and to improve the aesthetics of the steering wheel.

Such a lighting system mounted to a steering wheel provides direction information to a driver by turning on lamps included therein so as to indicate left/right directions of a vehicle.

When the steering wheel is in a normal angular position, the left/right lighting directions of the lighting system are identical to the left/right directions of the vehicle, thus causing no problem.

However, when the steering wheel is rotated 180° from the normal angular position, the left/right lighting directions of the lighting system are reversed, and thus become opposite the left/right directions of the vehicle.

If on/off operation of the lighting system is performed without considering the left-right reversed state, incorrect information about the direction is provided to a driver, which may cause a dangerous situation such as a traffic accident.

The information disclosed in this Background of the disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a system and method for controlling a lighting device for a steering wheel, which provide accurate direction information regardless of an angular position of the steering wheel.

In accordance with an aspect of the present disclosure, the above and other objects can be accomplished by the provision of a system for controlling a lighting device for a steering wheel, the system including a lighting device mounted to the steering wheel and configured to be selectively turned on in order to indicate left/right directions of a vehicle and a controller configured, upon receiving a request for turning on of the lighting device, to control turn-on operation of the lighting device such that left/right lighting directions of the lighting device are identical to the left/right directions of the vehicle when the angular position of the steering wheel is within a first steering angle range, herein referred to as a normal steering angle range encompassing a steering angle neutral position and such that the left/right lighting directions of the lighting device are opposite the left/right directions of the vehicle when the angular position of the steering wheel is within an inverted steering angle range vertically inverted from the normal steering angle range.

The system may further include a detector configured to detect the steering angle of the steering wheel, and the angular position of the steering wheel may be determined based on the absolute value of the steering angle detected by the detector.

When the angular position of the steering wheel is within the normal steering angle range, the lighting device may be controlled to be turned on such that the left/right lighting directions thereof are identical to the left/right directions of the vehicle. When the angular position of the steering wheel is within the inverted steering angle range, the lighting device may be controlled to be turned on such that the left/right lighting directions thereof are opposite the left/right directions of the vehicle.

A steering angle range not included in the normal steering angle range or the inverted steering angle range may be defined between the normal steering angle range and the inverted steering angle range.

When the angular position of the steering wheel is not within the normal steering angle range or the inverted steering angle range, the lighting device may be controlled to be turned off.

The lighting device may include a plurality of lamps disposed in the leftward-rightward direction of the vehicle so as to be spaced apart from each other at predetermined intervals.

The lighting device may include a plurality of lamps disposed in a band shape in the leftward-rightward direction of the vehicle.

In accordance with another aspect of the present disclosure, there is provided a method of controlling a lighting device for a steering wheel, the method including determining, by a controller, an angular position of the steering wheel upon receiving a request for turning on of the lighting device mounted to the steering wheel and configured to be selectively turned on in order to indicate left/right directions of a vehicle, turning on, by the controller, the lighting device such that left/right lighting directions of the lighting device are identical to the left/right directions of the vehicle when the angular position of the steering wheel is within a normal steering angle range encompassing a steering angle neutral position, and turning on, by the controller, the lighting device such that the left/right lighting directions of the lighting device are opposite the left/right directions of the vehicle when the angular position of the steering wheel is within an inverted steering angle range vertically inverted from the normal steering angle range.

The method may further include detecting, by a detector, a steering angle of the steering wheel, and the angular position of the steering wheel may be determined based on the absolute value of the detected steering angle.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION

Figure 1:
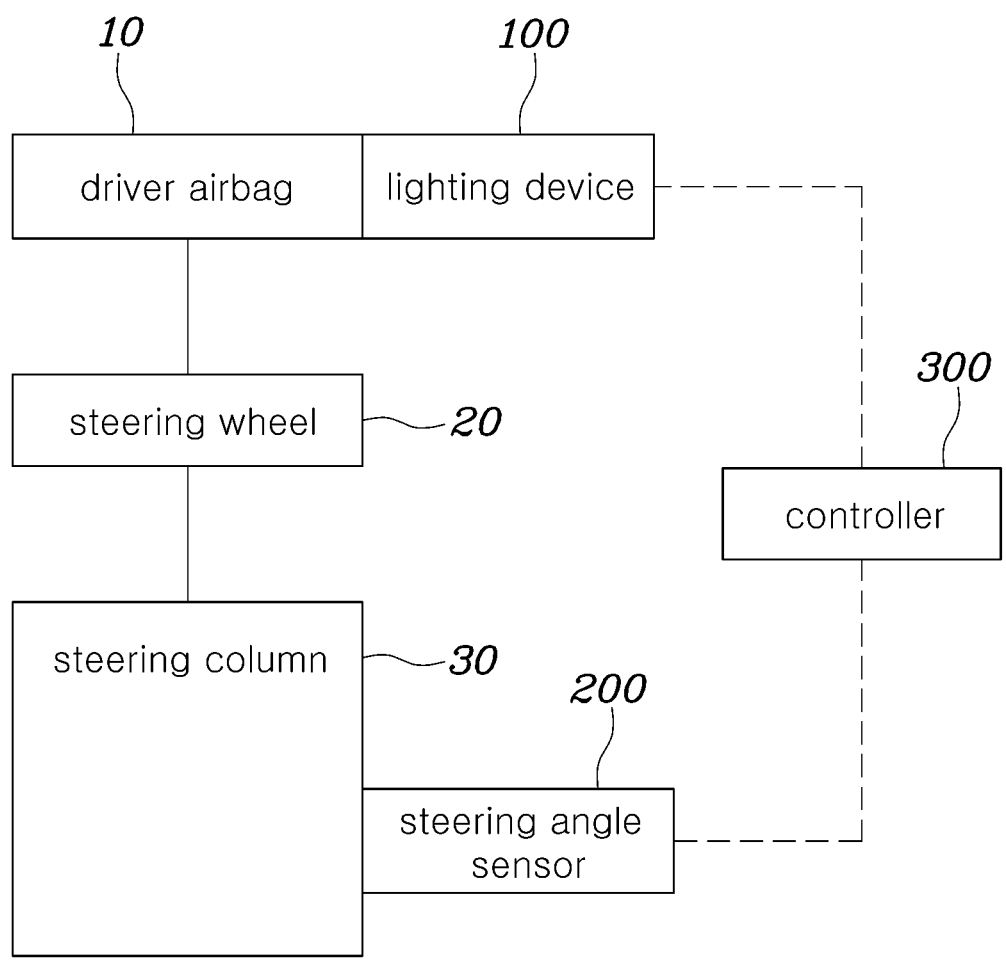
FIG. 1 is a diagram schematically showing the configuration of a system for controlling a lighting device according to the present disclosure.

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

In order to control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

FIG. 1 is a diagram schematically showing the configuration of a system for controlling a lighting device according to the present disclosure.

Referring to the drawing, a system for controlling a lighting device for a steering wheel 20 according to the present disclosure includes a lighting device 100, which is mounted to the steering wheel 20 and is configured to be selectively turned on in order to indicate left/right directions of a vehicle, and a controller 300, which is configured, upon receiving a request for turning on of the lighting device 100, to control turn-on operation of the lighting device 100 such that the left/right lighting directions of the lighting device 100 are identical to the left/right directions of the vehicle when the angular position of the steering wheel 20 is within a first steering angle range, herein referred to as a normal steering angle range encompassing a steering angle neutral position and such that the left/right lighting directions of the lighting device 100 are opposite the left/right directions of the vehicle when the angular position of the steering wheel 20 is within an inverted steering angle range vertically inverted from the normal steering angle range.

In detail, a driver airbag 10 is mounted in the center of the steering wheel 20, and the lighting device 100 is mounted to a cover of the driver airbag 10.

The lighting device 100 may include a plurality of lamps, such as light-emitting diodes (LEDs), which are disposed in the leftward-rightward direction. The lamps located at left and right positions may be selectively turned on. Alternatively, all of the lamps may be turned on at the same time.

The controller 300 may be mounted inside or outside the cover of the driver airbag 10, and may determine the angular position of the steering wheel 20.

Upon determining the angular position of the steering wheel 20, the controller 300 may control on/off operation of the lighting device 100 based on the angular position of the steering wheel 20.

Figure 2:
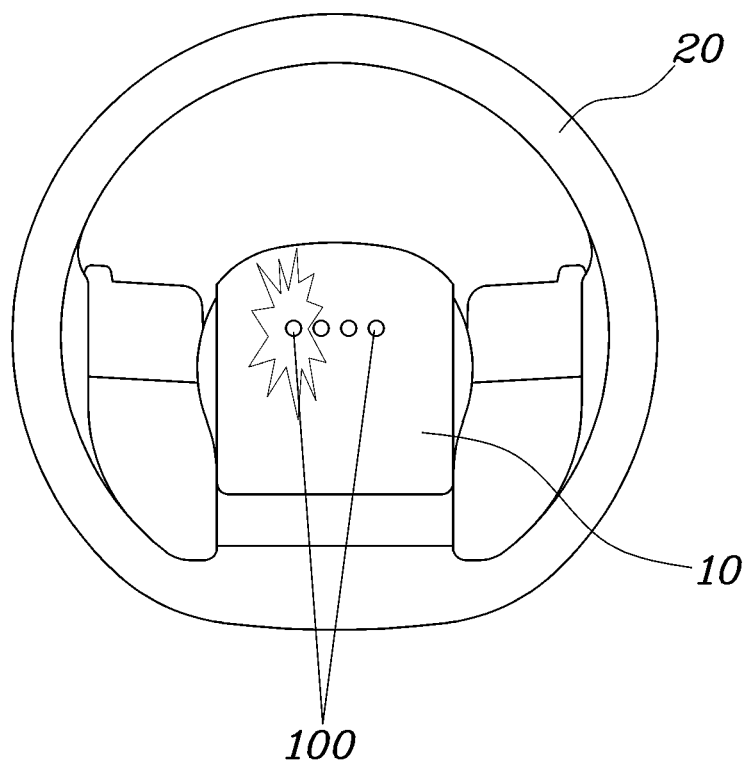
FIG. 2 is a view showing a state in which the lighting device according to the present disclosure is turned on to indicate a left direction when the angular position of a steering wheel is within a normal steering angle range.

Referring to FIG. 2, the controller 300 sets a predetermined rotational range of the steering wheel 20 in the clockwise direction and the counterclockwise direction from the angular position of the steering wheel 20 corresponding to the steering angle of 0° to the normal steering angle range.

Figure 3:
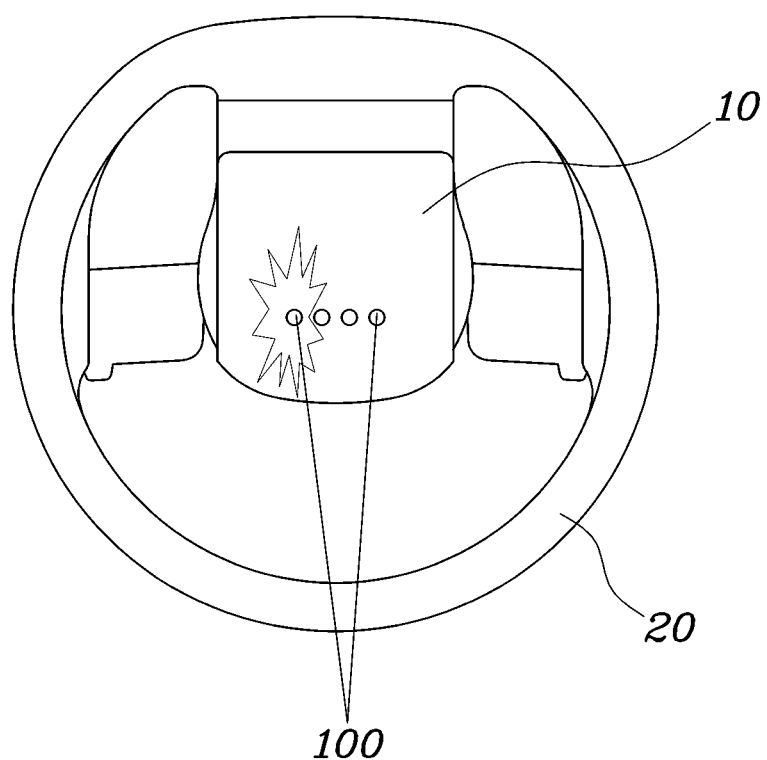
FIG. 3 is a view showing a state in which the lighting device according to the present disclosure is turned on to indicate a left direction when the angular position of the steering wheel is within an inverted steering angle range.

In addition, referring to FIG. 3, the controller 300 sets a predetermined rotational range of the steering wheel 20 in the clockwise direction and the counterclockwise direction from the angular position of the steering wheel 20 corresponding to the steering angle of 180° to the inverted steering angle range.

For example, upon receiving an operation signal for turning on of the lighting device 100 so as to indicate the left direction of the vehicle in the state in which the angular position of the steering wheel 20 is within the normal steering angle range, as shown in FIG. 2, the controller 300 turns on the leftmost lamp of the lighting device 100.

On the other hand, upon receiving an operation signal for turning on of the lighting device 100 so as to indicate the left direction of the vehicle in the state in which the angular position of the steering wheel 20 is within the inverted steering angle range, as shown in FIG. 3, i.e. in the state in which the steering wheel 20 is inverted vertically, the controller 300 turns on the rightmost lamp of the lighting device 100.

In this way, accurate information about left/right directions of the vehicle is provided to a driver regardless of the angular position of the steering wheel 20, whereby utilization of the lighting device 100 is increased, and occurrence of a traffic accident attributable to provision of incorrect information to the driver is prevented.

Figure 6:
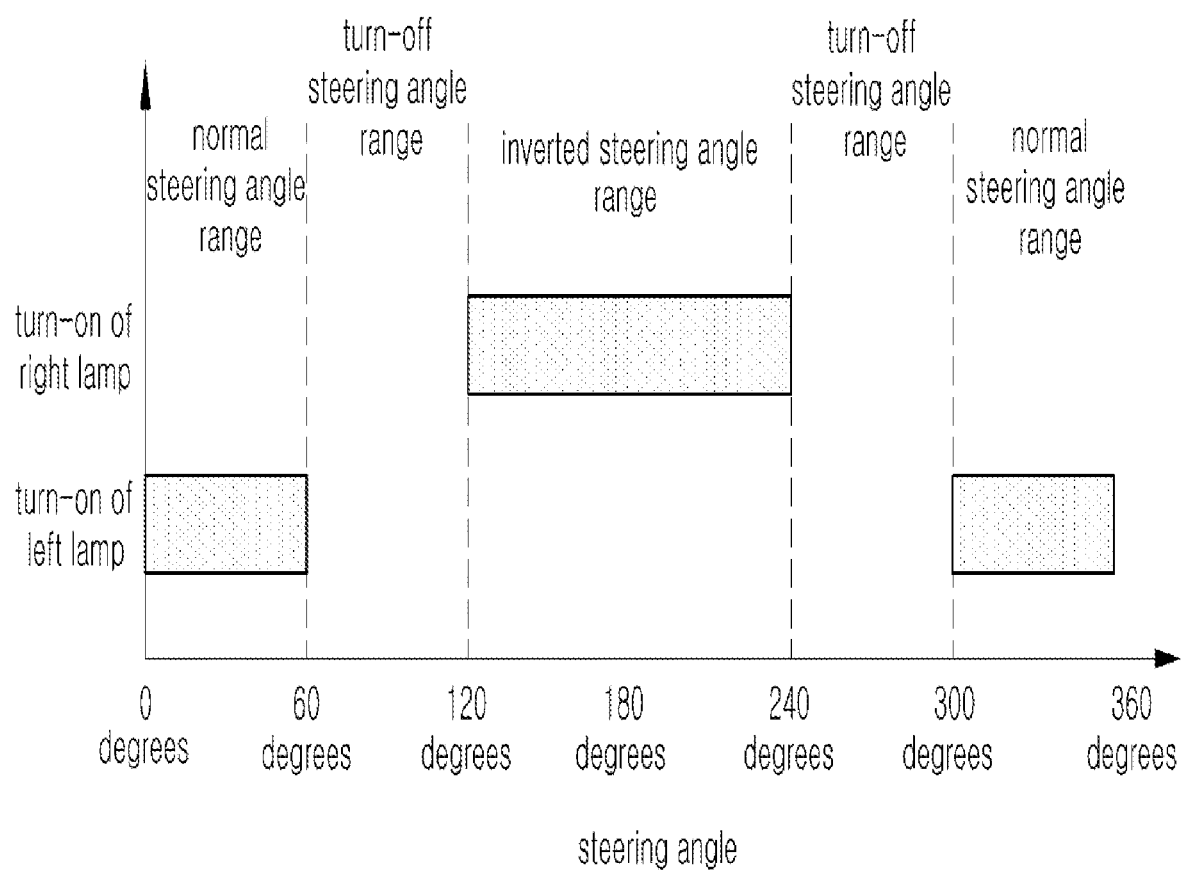
FIG. 6 is a diagram illustrating a turn-on steering angle range and a turn-off steering angle range when the lighting device according to the present disclosure performs turn-on operation to indicate the left direction of the vehicle.

FIG. 6 is a diagram illustrating a turn-on steering angle range and a turn-off steering angle range when the lighting device 100 according to the present disclosure performs turn-on operation to indicate the left direction of the vehicle.

Referring to FIGS. 1 and 6, the system for controlling a lighting device according to the present disclosure may further include a detector 200 configured to detect the steering angle of the steering wheel 20. The angular position of the steering wheel 20 may be determined based on the absolute value of the steering angle detected by the detector 200.

In detail, the steering wheel 20 is mounted to a steering column 30, and the rotational motion of the steering wheel 20 is transmitted to vehicle wheels.

The detector 200 may be a steering angle sensor. The steering angle sensor 200 is mounted to the steering column 30 to detect the steering angle of the steering wheel 20.

The steering angle is detected by the steering angle sensor 200 simultaneously with rotation of the steering wheel 20, and the angular position of the steering wheel 20 is determined based on the detected steering angle.

Further, since the angular position of the steering wheel 20 is determined using the absolute value of the steering angle of the steering wheel 20, it is possible to determine the angular position of the steering wheel 20 regardless of the clockwise or counterclockwise rotation direction of the steering wheel 20.

When the angular position of the steering wheel 20 is within the normal steering angle range, the lighting device 100 may be controlled to be turned on such that the left/right lighting directions thereof are identical to the left/right directions of the vehicle. When the angular position of the steering wheel 20 is within the inverted steering angle range, the lighting device 100 may be controlled to be turned on such that the left/right lighting directions thereof are opposite the left/right directions of the vehicle.

As shown in FIG. 6, when the steering wheel 20 is rotated to turn the vehicle to the left, the steering angle range from 0° to 60° and the steering angle range from 300° to 360° correspond to the normal steering angle range, in which the lighting device 100 is controlled to be turned on such that the left/right lighting directions thereof are identical to the left/right directions of the vehicle.

On the other hand, the steering angle range from 120° to 240° corresponds to the inverted steering angle range, in which the lighting device 100 is controlled to be turned on such that the left/right lighting directions thereof are opposite the left/right directions of the vehicle.

For reference, when the steering wheel 20 is rotated to turn the vehicle to the right, the control process is performed taking into consideration that the orientations of the steering wheel and the lighting device are left-right symmetric to those shown in FIG. 6.

Figure 4:
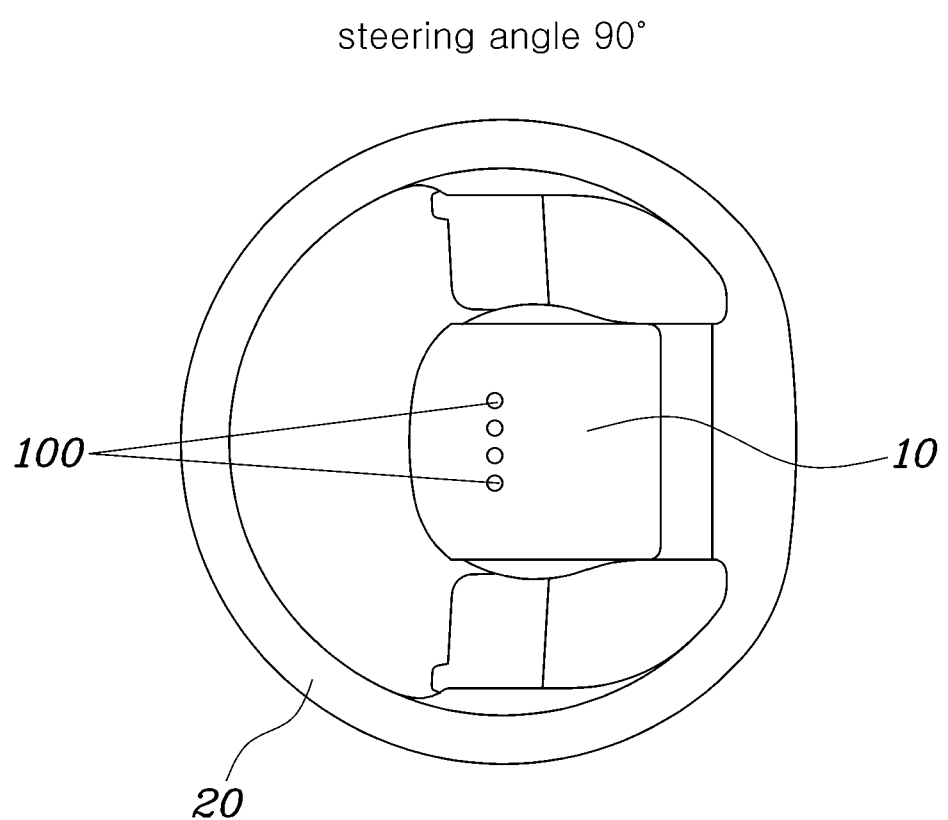
FIGS. 4 and 5 are views showing a state in which the lighting device according to the present disclosure is turned off when the angular position of the steering wheel is within a turn-off steering angle range.
Figure 5:
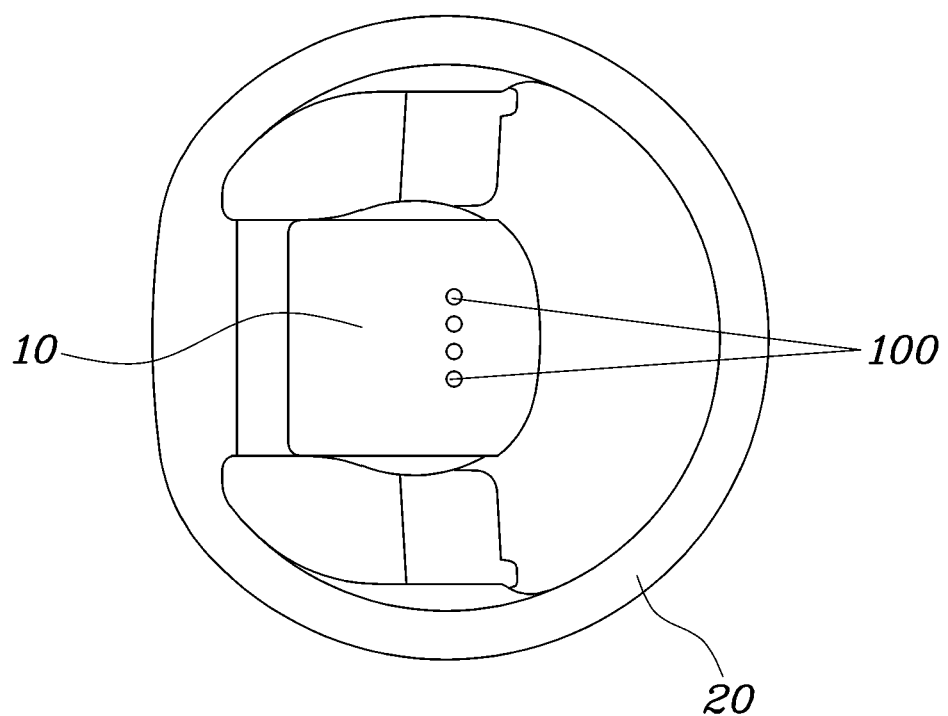

FIGS. 4 and 5 are views showing a state in which the lighting device 100 according to the present disclosure is turned off when the angular position of the steering wheel 20 is within the turn-off steering angle range.

Referring to FIGS. 4 to 6, a steering angle range, which is not included in the normal steering angle range or the inverted steering angle range, may be defined between the normal steering angle range and the inverted steering angle range.

For example, the steering angle range greater than 60° but less than 120° and the steering angle range greater than 240° but less than 300° are not included in the normal steering angle range or the inverted steering angle range described above.

When the angular position of the steering wheel 20 is not within the normal steering angle range or the inverted steering angle range, the lighting device 100 may be controlled to be turned off.

That is, the steering angle range that is not included in the normal steering angle range or the inverted steering angle range is a range within which the direction indicated by turn-on operation of the lighting device 100 becomes vague.

Therefore, the steering angle range greater than 60° but less than 120° and the steering angle range greater than 240° but less than 300° correspond to the turn-off steering angle range, in which all of the lamps included in the lighting device 100 are turned off.

The normal steering angle range, the inverted steering angle range, and the turn-off steering angle range are not limited to the above-mentioned ranges, and may be variously changed.

Figure 7:
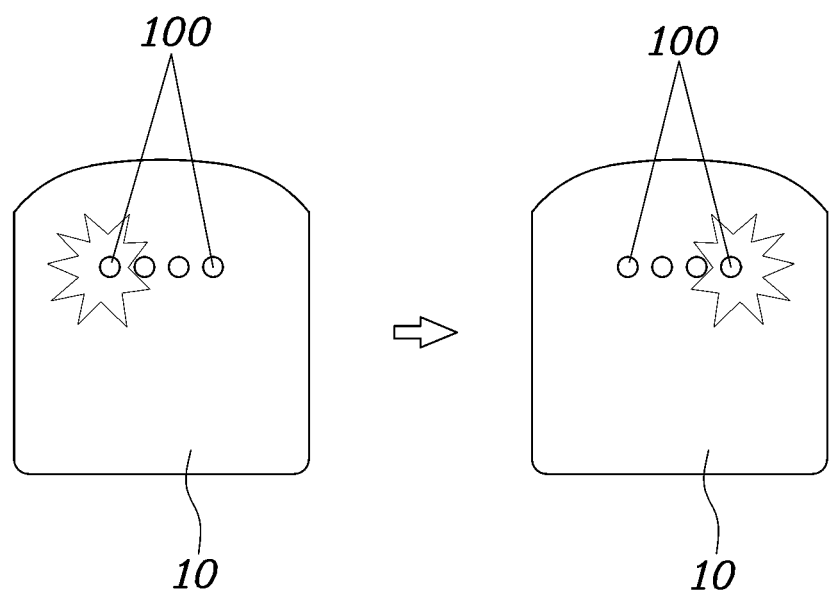
FIG. 7 is a view for explaining left/right turn-on operation of the lighting device including a plurality of lamps spaced apart from each other at predetermined intervals.

FIG. 7 is a view for explaining left/right turn-on operation of the lighting device 100 including a plurality of lamps spaced apart from each other at predetermined intervals.

Referring to the drawing, the lighting device 100 may include a plurality of lamps mounted to the cover of the driver airbag 10 and disposed in the leftward-rightward direction of the vehicle so as to be spaced apart from each other at predetermined intervals.

Among the plurality of lamps disposed in the leftward-rightward direction, the leftmost lamp or the rightmost lamp may be selectively turned on or may emit light having a different color according to the steering angle of the steering wheel.

Figure 8:
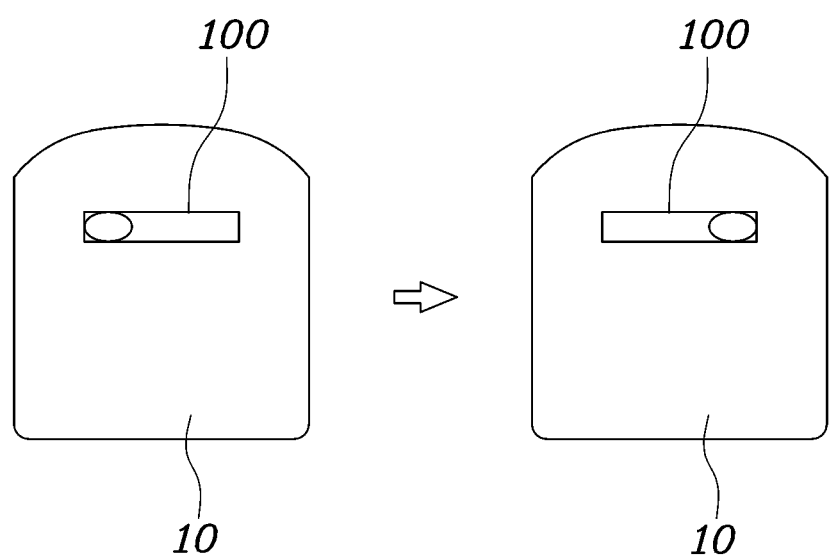
FIG. 8 is a view for explaining left/right turn-on operation of the lighting device including a plurality of lamps disposed in a band shape.

FIG. 8 is a view for explaining left/right turn-on operation of the lighting device 100 including a plurality of lamps disposed in a band shape.

Referring to the drawing, the lighting device 100 may include a plurality of lamps disposed in a band shape in the leftward-rightward direction of the vehicle.

Among the plurality of lamps disposed in the leftward-rightward direction, the leftmost lamp or the rightmost lamp may be selectively turned on according to the steering angle of the steering wheel.

Alternatively, both the lighting device 100 shown in FIG. 7 and the lighting device 100 shown in FIG. 8 may be configured such that all of the lamps are sequentially turned on in the left direction or the right direction. In this case, the lamps may be sequentially turned on in the left direction or the right direction according to the steering angle of the steering wheel.

In this way, the lighting device 100 performs turn-on operation indicating a corresponding direction, thereby providing direction information to the driver.

Figure 9:
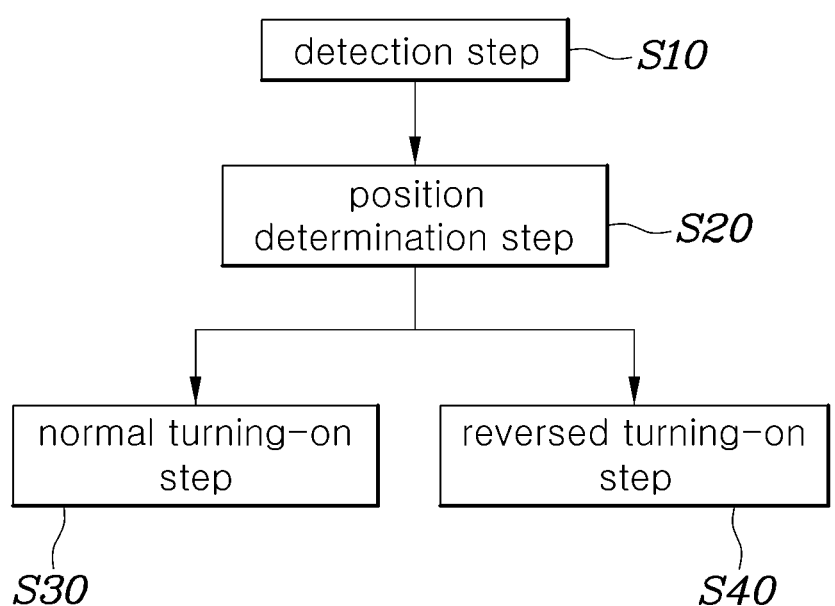
FIG. 9 is a diagram showing steps of a method of controlling a lighting device according to the present disclosure.

FIG. 9 is a diagram showing steps of a method of controlling a lighting device according to the present disclosure.

Referring to the drawing, a method of controlling the lighting device for the steering wheel 20 includes a position determination step of determining, by the controller 300, the angular position of the steering wheel 20 upon receiving a request for turning on of the lighting device 100 mounted to the steering wheel 20 and configured to be selectively turned on in order to indicate left/right directions of the vehicle, a normal turning-on step of turning on, by the controller 300, the lighting device 100 such that the left/right lighting directions of the lighting device 100 are identical to the left/right directions of the vehicle when the angular position of the steering wheel 20 is within the normal steering angle range encompassing the steering angle neutral position, and a reversed turning-on step of turning on, by the controller 300, the lighting device 100 such that the left/right lighting directions of the lighting device 100 are opposite the left/right directions of the vehicle when the angular position of the steering wheel 20 is within the inverted steering angle range vertically inverted from the normal steering angle range.

In addition, the method of controlling the lighting device for the steering wheel 20 may further include a detection step of detecting, by the detector 200, the steering angle of the steering wheel 20. The angular position of the steering wheel 20 may be determined based on the absolute value of the steering angle detected in the detection step.

Figure 10:
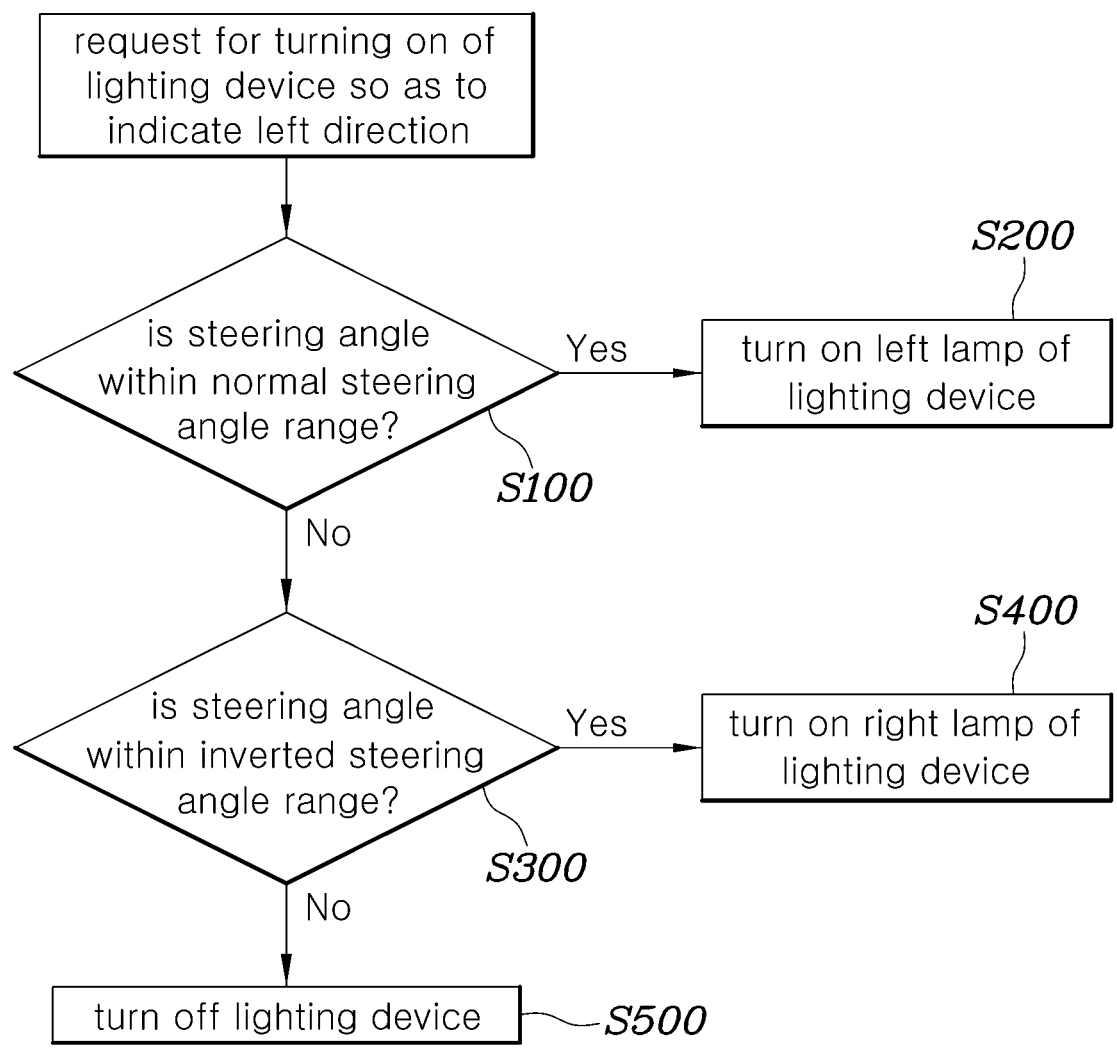
FIG. 10 is a flowchart illustrating a process of controlling the lighting device according to the present disclosure.

Hereinafter, a process of controlling the lighting device 100 according to the present disclosure will be described with reference to FIG. 10.

When there is a request for turning on of the lighting device 100 so as to indicate the left direction of the vehicle, a determination as to whether the current steering angle of the steering wheel 20 is within the normal steering angle range is made (S100).

When it is determined in step S100 that the steering angle of the steering wheel 20 is within the normal steering angle range, the leftmost lamp of the lighting device 100 is turned on, thereby providing information about the left direction to the driver (S200).

When it is determined in step S100 that the steering angle of the steering wheel 20 is not within the normal steering angle range, a determination as to whether the steering angle is within the inverted steering angle range is made (S300).

When it is determined in step S300 that the steering angle of the steering wheel 20 is within the inverted steering angle range, the rightmost lamp of the lighting device 100 is turned on, thereby providing information about the left direction to the driver (S400).

When it is determined in step S400 that the steering angle of the steering wheel 20 is not within the inverted steering angle range, it is determined that the steering angle is within the turn-off steering angle range. In this case, the lighting device 100 is turned off (S500).

Hereinafter, examples of providing notification to the driver using turn-on operation of the lighting device 100 will be described. In one example, when the driver turns on the right turn signal and changes the current lane to the right lane, if presence or approach of an object, such as a bicycle or another vehicle, moving on the right rear side of the vehicle is sensed, the rightmost lamp of the lighting device 100 may be turned on, thereby providing notification about the situation on the right side to the driver.

In another example, when a navigation system gives a notice of turning left at an intersection, the leftmost lamp of the lighting device 100 is turned on, thereby providing notification about the left turn to the driver.

In this case, the controller 300 and the navigation system may be communicably or electrically connected to each other.

In still another example, when the driver exits the vehicle, if presence or approach of an object, such as a bicycle or another vehicle, moving on the left rear side of the vehicle is sensed, the leftmost lamp of the lighting device 100 may be turned on, thereby providing notification about the situation on the left side to the driver.

As is apparent from the above description, according to the present disclosure, accurate information about left/right directions of the vehicle is provided to a driver regardless of the angular position of a steering wheel, whereby utilization of a lighting device is increased, and occurrence of a traffic accident attributable to provision of incorrect information to the driver is prevented.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A system comprising:
   a lighting device mounted on a steering wheel of a vehicle, the lighting device being configured to be selectively turned on in order to indicate left/right directions of the vehicle; and
   a controller configured, upon receiving a request for turning on of the lighting device, to control a turn-on operation of the lighting device such that left/right lighting directions of the lighting device are identical to the left/right directions of the vehicle when an angular position of the steering wheel is within a first steering angle range encompassing a steering angle neutral position and such that the left/right lighting directions of the lighting device are opposite the left/right directions of the vehicle when the angular position of the steering wheel is within an inverted steering angle range vertically inverted from the first steering angle range.

2. The system according to claim 1, further comprising a detector configured to detect a steering angle of the steering wheel,
   wherein the angular position of the steering wheel is determined based on an absolute value of the steering angle detected by the detector.

3. The system according to claim 1, wherein, when the angular position of the steering wheel is within the first steering angle range, the lighting device is controlled by the controller to be turned on such that the left/right lighting directions thereof are identical to the left/right directions of the vehicle, and
   wherein, when the angular position of the steering wheel is within the inverted steering angle range, the lighting device is controlled by the controller to be turned on such that the left/right lighting directions thereof are opposite the left/right directions of the vehicle.

4. The system according to claim 1, wherein a third steering angle range not included in the first steering angle range or the inverted steering angle range is defined between the first steering angle range and the inverted steering angle range.

5. The system according to claim 1, wherein, when the angular position of the steering wheel is not within the first steering angle range or the inverted steering angle range, the lighting device is controlled by the controller to be turned off.

6. The system according to claim 1, wherein the lighting device comprises a plurality of lamps disposed in a leftward-rightward direction of the vehicle so as to be spaced apart from each other at predetermined intervals along the leftward-rightward direction.

7. The system according to claim 1, wherein the lighting device comprises a plurality of lamps disposed in a band shape in a leftward-rightward direction of the vehicle.

8. The system according to claim 1, wherein the steering angle neutral position is a steering angle of the steering wheel of 0 degrees, wherein the first steering angle range is in a range substantially between 300 degrees and 60 degrees relative to the steering angle neutral position, and wherein the inverted steering angle range is substantially between 120 degrees and 240 degrees relative to the steering angle neutral position.

9. The system according to claim 4, wherein the steering angle neutral position is a steering angle of the steering wheel of 0 degrees, wherein the first steering angle range is in a range substantially between 300 degrees and 60 degrees relative to the steering angle neutral position, wherein the inverted steering angle range is in a range substantially between 120 degrees and 240 degrees relative to the steering angle neutral position, and wherein the third steering angle range includes ranges substantially between 60 degrees to 120 degrees and 240 to 300 degrees relative to the steering angle neutral position.

10. A method of controlling a lighting device mounted on a steering wheel of a vehicle, the method comprising:
determining, by a controller, an angular position of the steering wheel upon receiving a request for turning on of the lighting device mounted to the steering wheel and configured to be selectively turned on in order to indicate left/right directions of the vehicle;
turning on, by the controller, the lighting device such that left/right lighting directions of the lighting device are identical to the left/right directions of the vehicle when an angular position of the steering wheel is within a first steering angle range encompassing a steering angle neutral position; and
turning on, by the controller, the lighting device such that the left/right lighting directions of the lighting device are opposite the left/right directions of the vehicle when the angular position of the steering wheel is within an inverted steering angle range vertically inverted from the normal steering angle range.

11. The method according to claim 10, further comprising detecting, by a detector, a steering angle of the steering wheel,
wherein the angular position of the steering wheel is determined based on an absolute value of the detected steering angle.

12. The method according to claim 10, wherein, when the angular position of the steering wheel is within the first steering angle range, the lighting device is controlled by the controller to be turned on such that the left/right lighting directions thereof are identical to the left/right directions of the vehicle, and
wherein, when the angular position of the steering wheel is within the inverted steering angle range, the lighting device is controlled to be turned on such that the left/right lighting directions thereof are opposite the left/right directions of the vehicle.

13. The method according to claim 10, wherein a third steering angle range not included in the first steering angle range or the inverted steering angle range is defined between the normal steering angle range and the inverted steering angle range.

14. The method according to claim 10, wherein, when the angular position of the steering wheel is not within the first steering angle range or the inverted steering angle range, the lighting device is controlled by the controller to be turned off.

15. The method according to claim 10, wherein the steering angle neutral position is a steering angle of the steering wheel of 0 degrees, wherein the first steering angle range is in a range substantially between 300 degrees and 60 degrees relative to the steering angle neutral position, and wherein the inverted steering angle range is in a range substantially between 120 degrees and 240 degrees relative to the steering angle neutral position.

16. The method according to claim 13, wherein the steering angle neutral position is a steering angle of the steering wheel of 0 degrees, wherein the first steering angle range is in a range substantially between 300 degrees and 60 degrees relative to the steering angle neutral position, wherein the inverted steering angle range is in a range substantially between 120 degrees and 240 degrees relative to the steering angle neutral position, and wherein the third steering angle range includes ranges substantially between 60 degrees to 120 degrees and 240 to 300 degrees relative to the steering angle neutral position.

* * * * *